June 14, 1938.  D. C. BETTISON  2,120,389

VALVE ACTUATING MEANS

Filed Jan. 11, 1936   2 Sheets-Sheet 1

INVENTOR.

D. C. BETTISON

BY John C. Barsch

ATTORNEY.

June 14, 1938.  D. C. BETTISON  2,120,389
VALVE ACTUATING MEANS
Filed Jan. 11, 1936   2 Sheets-Sheet 2

INVENTOR.
D. C. BETTISON
BY John C. Barsch
ATTORNEY.

Patented June 14, 1938

2,120,389

UNITED STATES PATENT OFFICE 2,120,389

VALVE ACTUATING MEANS

David C. Bettison, Omaha, Nebr.

Application January 11, 1936, Serial No. 58,675

2 Claims. (Cl. 123—90)

My invention relates to means for actuating valves, particularly valves of the poppet type, such as are used for the more common forms of internal combustion engines, and wherein the relation of the valves to their cams, or primary actuating members, is subject to variation by thermal expansion and contraction of the valve-stems, push-rods or tappets, engine-cylinders, and other parts with which the valves are associated. It is customary in the construction of internal combustion engines to provide, in the connecting means between the valves and the cams by which the same are actuated, suitable gaps or clearance-spaces of such extent as to accommodate the usual thermal variations in the length of the parts, whereby seating of the valves is assured under all conditions of operation, and expansion or lengthening of the members intermediate a valve and its cam will result merely in shortening the gap or clearance, without causing the valve to be held off its seat at times when it should be fully closed.

In automobile engines of the types now in general use, the minimum clearance provided in the valve-lifting means ranges from four-thousandths to fifteen-thousandths of an inch, measured at a time when the engine is considered to be at a normal operating temperature, and frequent re-adjustment of the valve-lifters is necessary for maintaining of proper clearance, as too little clearance may result in preventing seating of a valve, while excessive clearance causes noisy operation and impairs the efficiency of the engine by reducing lift of the valve, starting opening of the valve later in the cycle, and completely closing of the valve earlier in the cycle than when the operation is normal. Lack of uniformity of clearance in the adjustments of the several valves of an engine causes uneven running and excessive valve noise, while the sounds caused by operation when the valve-clearances are adjusted to uniformity have been deemed heretofore as unavoidable.

It is the object of my invention to provide for valves of the class described, actuating devices having means for automatically compensating for variations in the relation of a valve and its cam or primary actuating member, whereby to assure efficient operation and uniform running of an engine at all times, to avoid the necessity for frequent re-adjustment of the valve-actuating members, and to substantially eliminate the noise which ordinarily results from the existence of clearance-spaces in the valve-actuating connections. My invention provides an intermediary of variable length interposed between a valve and its primary actuating member, or cam, said intermediary having means tending constantly to expand or increase the effective length thereof, but with a force less than enough to effect lifting or unseating of the valve, and said intermediary being subject to a limited reduction of its effective length during each valve-opening operation of the cam or primary actuating member.

It is a further object of my invention to provide said actuating means with expansible, sound-muffling means, said latter means being self-aligning to constantly maintain the parts thereof in effective operative relationship. Said muffling means is particularly characterized by the use of oil under pressure introduced between cushioning members, the adjacent faces thereof being of relatively large area and substantially parallel with each other, said oil forming a cushioning film between said members and being substantially unconfined after passing from between said members.

Other objects of the invention will appear in the following detailed description taken in connection with the accompanying drawings wherein.

Figure 1:
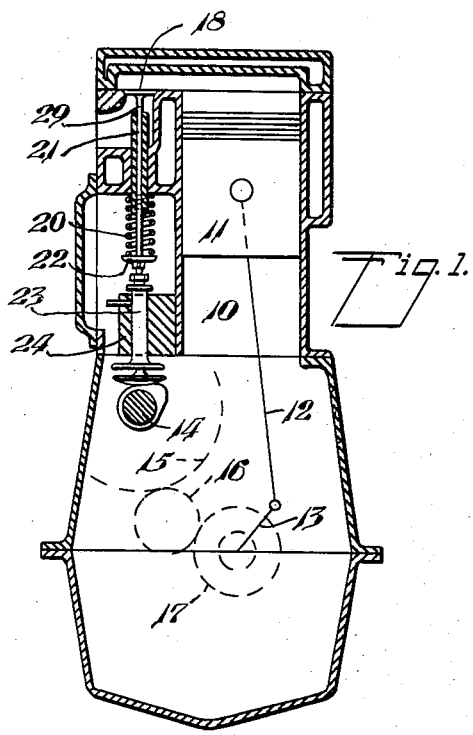
Figure 1 is a diagrammatic view of a section through an L-head automotive type of internal combustion engine employing my invention.

Referring to the drawings, there is represented in Figure 1 an internal combustion engine of conventional automotive type, having an L-head cylinder 10, piston 11, connecting rod 12, crank-shaft 13, cam-shaft 14, and gearing 15, 16 and 17 forming a driving connection between the crank-shaft and cam-shaft. The valve 18 opens into the valve-chamber of the L-head cylinder, the valve-stem 19 extending parallel with the cylinder and its axis intersecting the axis of the cam-shaft. The valve is held normally in closed position by a spring 20 disposed about the lower portion of the valve-stem, between the guide 21 for said stem and a spring-cup 22 attached to the lower portion of the stem. The stem 23 of the valve-lifter or tappet is slidable vertically in guide 24.

Figures 3, 4, 5:
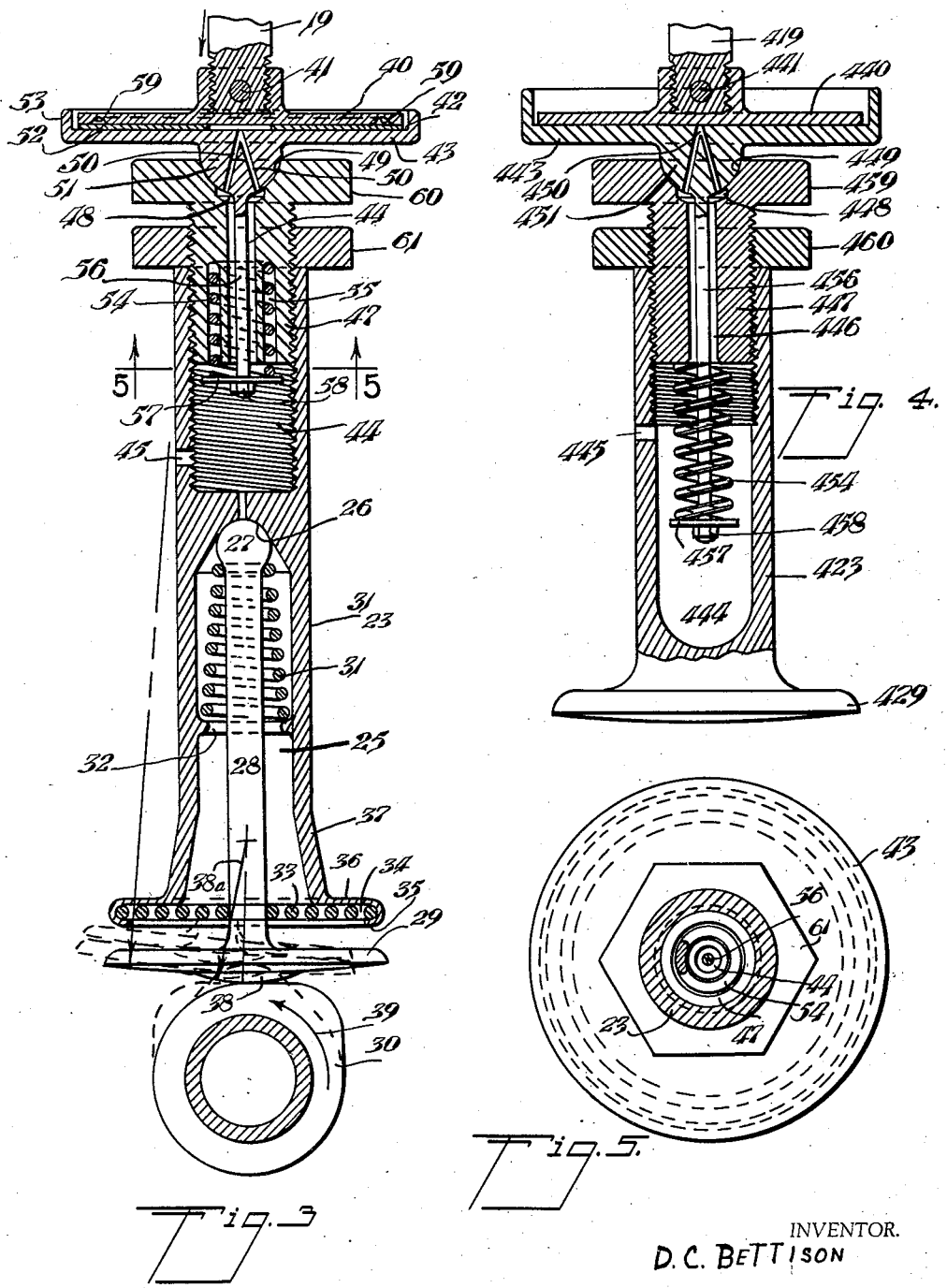
Figure 3 is a longitudinal section of the preferred embodiment of my invention including the sound muffling means.
Figure 4 is a broken longitudinal section of one embodiment of the self-aligning muffling means.
Figure 5 is a cross-section of the device taken on line 5—5 of Figure 3.

Referring particularly to Figure 3 said stem 23 is provided with a longitudinal chamber 25 extending upwardly from the bottom thereof and terminating in a socket 26 adapted to operatively receive a ball-member 27 of stem 28 of tappet-foot 29 to permit a free oscillating movement of the tappet-foot 29 during rotation of cam 30 upon which foot 29 operatively rests. Due to the stem 23 being free to rotate in the guide 24 it is necessary that the tappet-foot be free to oscillate or swing in any direction relative to said stem 23 although the oscillating movement of the foot 29 relative to the cam is always the same. The tappet-foot swings in an arc the radius of which is the length of the stem thereof, and the ball-member 27 of said stem is operatively held in the socket 26 by a helical spring 31 tapering upwardly about the upper end of said stem 28 and abutting against the lower portion of said ball-member. The lower end of said spring abuts against an annular abutment 32 provided therefor within the chamber 25. A spiral spring 33 mounted in an annular groove 34 formed by turning in edge 35 of a flange 36 of the stem 23 adjacent the lower edge thereof, said spring 33 providing means tending constantly to center the tappet-foot but with insufficient force to cause lifting or unseating of the valve. The stem 23 is provided with an outwardly flaring portion 37 adjacent the bottom thereof to permit a greater swing or oscillation of the tappet foot.

The lower face of the tappet-foot is provided with a uniformly curved protuberance 38, the curve of said protuberance having a radius 38a, of less length than the radius of the arc of the swing of the tappet-foot. Due to the curved surface of the protuberance 38 having a radius of less length than the radius of the arc described by the tappet-foot during oscillation thereof the effective length of the tappet-foot is increased toward the center thereof. The effective length of the tappet-foot is at its maximum when said foot is in a perpendicular position in the center of the tappet-stem with the axis of said foot bisecting the axis of the cam-shaft. The effective length of said foot is respectively reduced in various off-center positions reaching its minimum when the tappet-foot has reached the limit of outward swing. The cam, as it rotates in the direction indicated by arrow 39 to raise the valve, will tend to arcually swing the tappet-foot in a corresponding direction and will thereby somewhat reduce the effective length of the tappet though said swing of the tappet-foot will be yieldably resisted by spring 33. After the cam-lug has passed the tappet-foot and the valve has closed, the spring 33 will tend to center said tappet-foot. Due to the protuberance 38 of the tappet-foot, which increases the effective length of the tappet as said foot is drawn toward its center position, valve clearance that would otherwise occur, is taken up, and, if such clearance is less than the effective height of the protuberance, the foot will not completely center but will ride the cam in a slightly off center position. Should the cylinder and other associated parts of the engine decrease in length relative to the valve actuating mechanism the tappet-foot will ride the cam further off center than when said cylinder and other associated parts of the engine increase in length relative to the valve actuating mechanism due to the greater relative central height of the protuberance.

In case the expansion of the cylinder and associated engine parts is greater, relative to the valve actuating means, than the maximum effective height of the protuberance of the tappet-foot, said tappet-foot will be centered by spring 33 and will then ride the cam in that position and any tappet clearance will be yieldingly taken up by the forced separation of the cushioning members which comprise a disk 40, screwed to the lower end of the valve stem 19 and secured by a pin 41, and the bottom 42 of cup 43 by the pressure of oil forced therebetween by an oil pump, not shown, said oil entering upper chamber 44 of the tappet-stem 23 through an opening 45 and passing upwardly through an oil passage 46 in an adjustment plug 47 threadably received in the upper end of chamber 44, into an annular channel 48 of a socket 49 and through converging oil passages 50 in ball 51 of cup 43, said passages 50 meeting adjacent the upper surface of the bottom 42 and opening into said cup 43. A washer 52, preferably possessing slight resilience and sound absorbing qualities, interposed between the bottom 42 of the cup 43 and the disk 40, is provided with a central hole therethrough into which the oil entering the cup is received. The oil, being under pressure, escapes between the washer and the cup bottom and the disk respectively, tending to forcibly separate the disk and cup and providing therebetween a plurality of oil cushions. The cushioning effect of the oil depends upon the molecular cohesion thereof and the heavier the oil the greater will be the cohesion of its molecules and the more effectively will it absorb sounds and jars. The escaped oil, being substantially unconfined, overflows the upturned edge 53 of the cup and may be returned to the crankcase or other engine oil reservoir by any suitable means.

To reduce or substantially eliminate flattening and wear of the washer and the disk and cup bottom and provide large area oil cushions, the washer, disk and cup provided are relatively large. As is common practice the tappet and valve stem have only a contactual relationship with each other, and because of the relatively large size of the contacting surfaces of the cup and disk, with the washer interposed therebetween, of the tappet and stem respectively, distortion or deviation from proper alinement of the valve stem or tappet would cause tipping of the valve. To eliminate said tipping and at the same time provide effective oil cushions between the cup and the disk it is necessary that said cup, washer and disk contacting surfaces be parallel to each other respectively. To automatically maintain said parallel relationship of the cup, washer and disk contacting surfaces the ball-member 51 of the cup is provided which is adapted to turn freely, within limits, in any direction, in socket 49 thereby allowing the cup to accommodate itself to ordinary deviations from alinement of the valve-stem 19 or the tappet. The ball-member 51 is operatively held in socket 49 by a spring 54 seated in an annular spring chamber 55 in the lower part of plug 47 and disposed about the lower end of a depending stem 56 of the ball-member 41 loosely received in oil passage 46 of the plug 47. The lower end of spring 54 abuts against a washer 57 secured to the lower end of the depending stem 56 by a nut 58. An annular oil groove 59 is provided in the lower face of the disk 40 to retard the flow of oil from between said disk and the washer 52.

Adjustment of the tappet is done preferably while the engine is warm. The adjustment plug 47 is provided with a nut portion 60 to aid in gripping said plug when adjusting same and is held in adjusted positions by a lock-nut 61.

Figure 4 illustrates an embodiment of my self-alining, muffling mechanism used with an ordinary tappet-foot 429, tappet-stem 423 being provided with a chamber 444 threadably receiving an adjustment plug 447 which is held in adjusted positions by a lock nut 460. The upper end of said plug is provided with a nut-portion 459 and has a socket 449 provided in the upper end in which is operatively received a ball-member 451 of cup 443. Disk 440, screwed to the end of valve stem 419 and held against turning thereon by a pin 441, is contactually received in the cup in parallel relationship to the bottom thereof. The ball-member 451 moves, within limits, in any direction in the socket 449 to allow the cup to adjust itself parallely to the bottom surface of the disk 440. A stem 456 depending from the ball and loosely received in passage 446 is provided with a washer 457 secured on said stem by a nut 458. A spring 454, disposed about the lower part of the stem 456 is provided to operatively secure the ball-member in its socket 449. Oil from an oil pump, not shown, is admitted to chamber 444 through oil opening 445 and passes upwardly through passage 446 to annular channel 448 in the socket 449, through converging oil passages 450 in the ball member and into the cup between the bottom thereof and the lower face of the disk. The oil escapes between the lower disk surface and the bottom of the cup and provides an expansible oil cushion therebetween.

Figure 2:
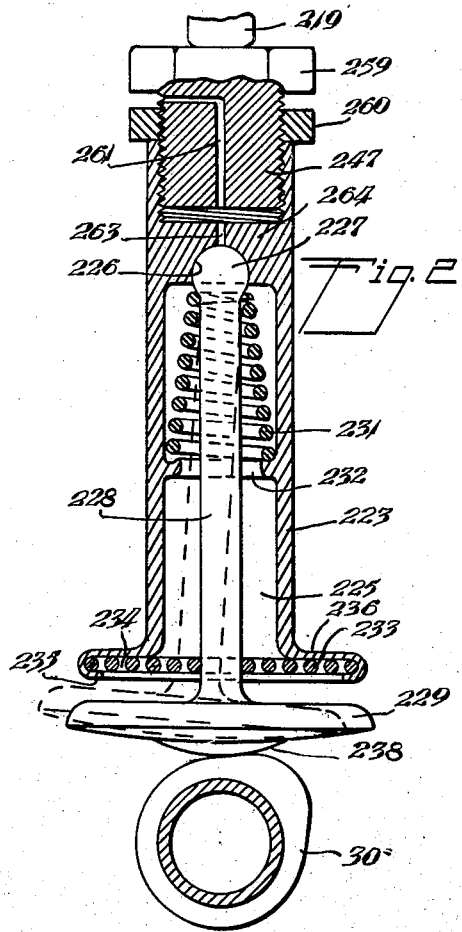
Figure 2 is a broken longitudinal view of one embodiment of the rotating, oscillating length compensating means with a cam in operative position thereunder.

Figure 2 illustrates an embodiment of my oscillating or swinging tappet-foot employed without the expansible, self-alining muffing means. Tappet-stem 223 is provided with a chamber 225 having a socket 226 in the upper end thereof adapted to receive a ball-member 227 of stem 228 of oscillating tappet-foot 229. The ball member of the tappet-foot is operatively held in the socket 226 by a helical spring 231 tapering upwardly about the upper end of the stem 228 and engaging the lower portion of the ball-member 227. The lower end of spring 231 abuts against an annular abutment 232 provided therefore within the chamber 225. A spiral spring 233, mounted in an annular groove 234 formed by turning in edge 235 of flange 236 of the stem 223, adjacent the lower end thereof, provides centering means for the tappet-foot and said tappet foot is provided with a uniformly curved protuberance 238 similar to the protuberance 38 of the tappet-foot 29 illustrated in Figure 3.

The upper end of stem 223 is provided with a threaded opening for receiving adjustment plug 247. The plug 247 has a nut-portion 259 at its upper end to facilitate adjustment thereof and a lock-nut 260 to secure said plug in adjusted positions. The lower end of valve-stem 219 rests freely on the upper end of the plug. An oil passage 261 in the plug and passage 263 in the transverse stem-wall 264 provides means for admitting oil to the ball 227 and socket 226 for oiling same. The operation of the tappet-foot is substantially the same as the tappet-foot 29 illustrated in Figure 3.

Having thus described my invention, what I claim and desire to secure by Letters Patent is:

1. In an intermediary for use in internal combustion engines wherein a spring-closed valve is openable by pressure transmitted from a cam through the intermediary, comprising a tappet-stem, an oscillating tappet-foot having a protuberance thereon and operatively associated with the cam, the axis of said tappet-foot bisecting the axis of the cam, and means for yieldably centering the tappet-foot, said tappet-foot being adapted to be oscillated by the cam upon rotation thereof, and said protuberance being adapted to co-act with the cam to vary the effective length of the intermediary from a maximum effective length when the tappet-foot is in a centered position to a minimum effective length when the tappet-foot is at its outward limit of movement.

2. An intermediary produced in internal combustion engines wherein a spring closed valve is operable by pressure, transmitted from a cam through said intermediary which comprises a tappet-stem and oscillating tappet-foot adapted for operative association with a cam, means on the tappet-foot to vary the effective length of said intermediary, said intermediary being at its maximum effective length when the tappet-foot is at its central position relative to the cam and at its minimum effective length when said tappet-foot is at its outward limit of movement relative to said cam, and yielding means for normally centering said foot, said foot being adapted to be oscillated by the cam to vary the effective length of said intermediary.

DAVID C. BETTISON.